United States Patent
Kraleti et al.

(10) Patent No.: US 10,994,439 B2
(45) Date of Patent: May 4, 2021

(54) TURBINE BLADE MANUFACTURING METHOD

(71) Applicant: Nuovo Pignone Tecnologie—S.R.L., Florence (IT)

(72) Inventors: Pradeep Kumar Kraleti, Bangalore (IN); Nagaraju Matta, Bangalore (IN)

(73) Assignee: Nuovo Pignone Tecnologie—S.R.L, Florence (IT)

( * ) Notice: Subject to any disclaimer, the term of this patent is extended or adjusted under 35 U.S.C. 154(b) by 0 days.

(21) Appl. No.: 15/766,998

(22) PCT Filed: Oct. 20, 2016

(86) PCT No.: PCT/EP2016/075186
§ 371 (c)(1),
(2) Date: Apr. 9, 2018

(87) PCT Pub. No.: WO2017/068023
PCT Pub. Date: Apr. 27, 2017

(65) Prior Publication Data
US 2018/0297232 A1      Oct. 18, 2018

(30) Foreign Application Priority Data

Oct. 20, 2015   (IT) .................... 102015000063603

(51) Int. Cl.
*B22C 9/02*     (2006.01)
*B22C 9/10*     (2006.01)
(Continued)

(52) U.S. Cl.
CPC ............... *B28B 1/001* (2013.01); *B22C 9/02* (2013.01); *B22C 9/10* (2013.01); *B22C 9/22* (2013.01);
(Continued)

(58) Field of Classification Search
CPC ............................. B22D 27/04; B22D 27/045
See application file for complete search history.

(56) References Cited

U.S. PATENT DOCUMENTS 2,594,998 A * 4/1952 Rocco ................... C30B 11/002
                                                164/122.2
5,611,670 A * 3/1997 Yoshinari ............. B22D 27/045
                                                416/241 R (Continued)

FOREIGN PATENT DOCUMENTS

CN        102745988 A      10/2012
EP        1 495 820 B1      5/2007
(Continued)

OTHER PUBLICATIONS

Bae, C., "Integrally Cored Ceramic Investment Casting Mold Fabricated by Ceramic Stereolithography," Materials Science and Engineering, pp. 1-228 (2008).

(Continued)

*Primary Examiner* — Kevin E Yoon
*Assistant Examiner* — Jacky Yuen
(74) *Attorney, Agent, or Firm* — Dinsmore & Shohl LLP

(57) ABSTRACT

A method for manufacturing a turbine blade 1, is provided. The method comprises the following steps: producing a shell and core assembly by additive manufacturing process, the shell and core assembly defining at least one internal cavity and having an internal structure corresponding to at least one internal cooling circuit of the turbine blade; pouring molten metal in the internal cavity of the shell and core assembly; solidifying the metal; removing the shell and core assembly.

11 Claims, 6 Drawing Sheets

(51) Int. Cl.

| | | |
|---|---|---|
| *B22D 27/04* | (2006.01) | |
| *B28B 7/34* | (2006.01) | |
| *B33Y 10/00* | (2015.01) | |
| *B28B 1/00* | (2006.01) | |
| *B22C 9/22* | (2006.01) | |
| *F01D 5/18* | (2006.01) | |
| *B33Y 80/00* | (2015.01) | |

(52) U.S. Cl.
CPC ............ *B22D 27/045* (2013.01); *B28B 7/346* (2013.01); *F01D 5/187* (2013.01); *B33Y 10/00* (2014.12); *B33Y 80/00* (2014.12); *F05D 2230/21* (2013.01); *Y02P 10/25* (2015.11)

(56) References Cited

U.S. PATENT DOCUMENTS

| | | | |
|---|---|---|---|
| 7,413,001 B2 | 8/2008 | Wang et al. | |
| 7,690,894 B1 | 4/2010 | Liang | |
| 8,066,483 B1 | 11/2011 | Liang | |
| 2004/0231822 A1 | 11/2004 | Frasier et al. | |
| 2010/0003619 A1 | 1/2010 | Das et al. | |
| 2013/0266816 A1* | 10/2013 | Xu .......................... | B33Y 10/00 428/450 |
| 2013/0333950 A1* | 12/2013 | Atkins ..................... | B22C 9/02 175/327 |
| 2015/0352630 A1* | 12/2015 | Bewlay .................... | B22C 1/00 164/349 |
| 2016/0332253 A1* | 11/2016 | Nardi ...................... | B33Y 10/00 |

FOREIGN PATENT DOCUMENTS

| | | | | |
|---|---|---|---|---|
| JP | 2007-320847 A | 12/2007 | | |
| WO | 2015/069411 A1 | 5/2015 | | |
| WO | 2015112733 A1 | 7/2015 | | |
| WO | WO-2015112885 A1 * | 7/2015 | ............... | B22C 9/10 |

OTHER PUBLICATIONS

Guire, E. D., "Solid Freeform Fabrication of One-piece Investment Casting Molds for Airfoils," The American Ceramic society, pp. 1-4 (Nov. 17, 2011) (Abstract).

Klocke, F., and Ader, C., "Direct Laser Sintering of Ceramics," Fraunhofer Institute for Production Technology IPT, pp. 447-455 (2003).

Italian Search Report and Written Opinion issued in connection with corresponding IT Application No. 102015000063603 dated Jun. 8, 2016.

International Search Report and Written Opinion issued in connection with corresponding PCT Application No. PCT/EP2016/075186 dated Jan. 31, 2017.

International preliminary report on patentability issued in connection with corresponding PCT Application No. PCT/EP2016/075186 dated Apr. 24, 2018.

English Translation of Chinese office action for application 201680061761.5 dated Oct. 26, 2020 (18 pages).

* cited by examiner

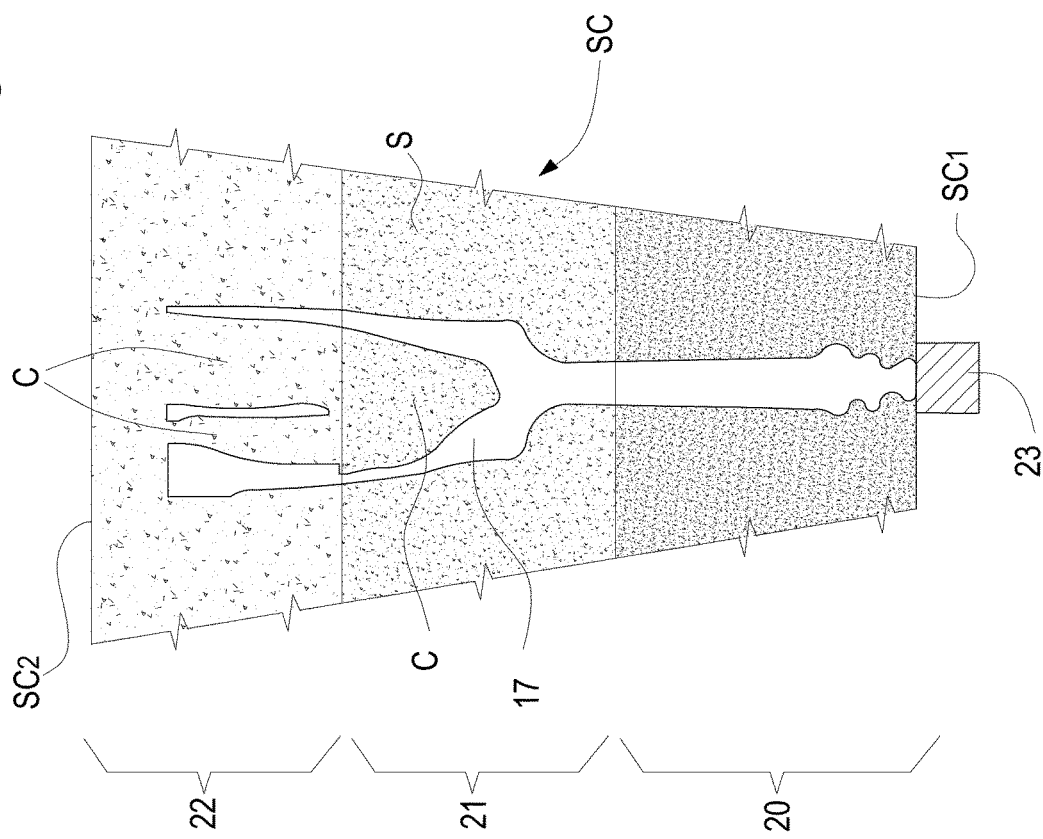
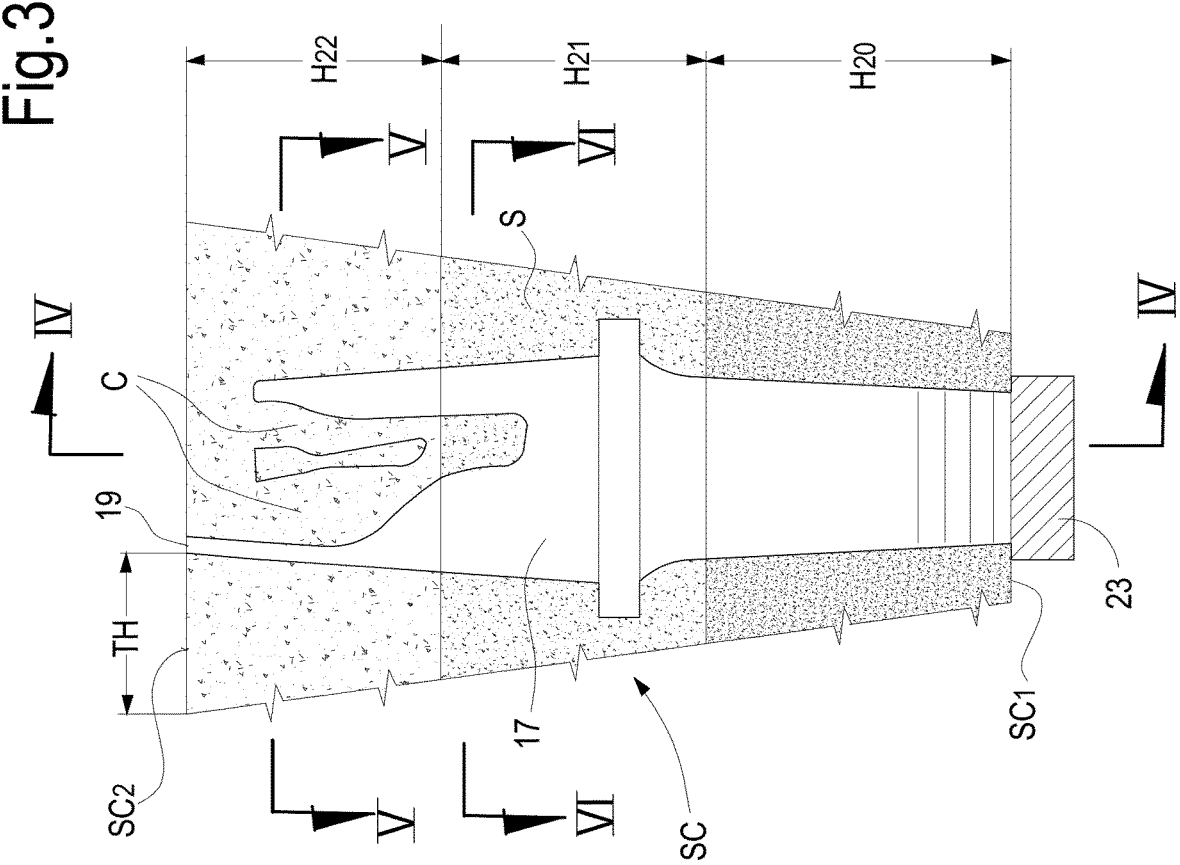

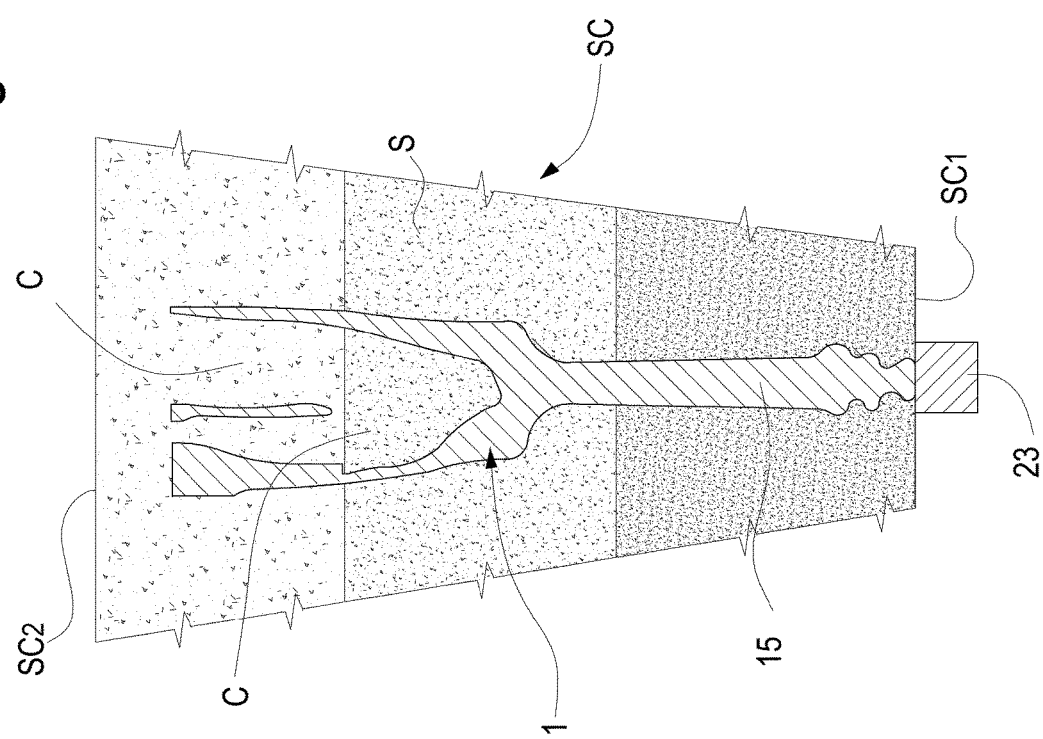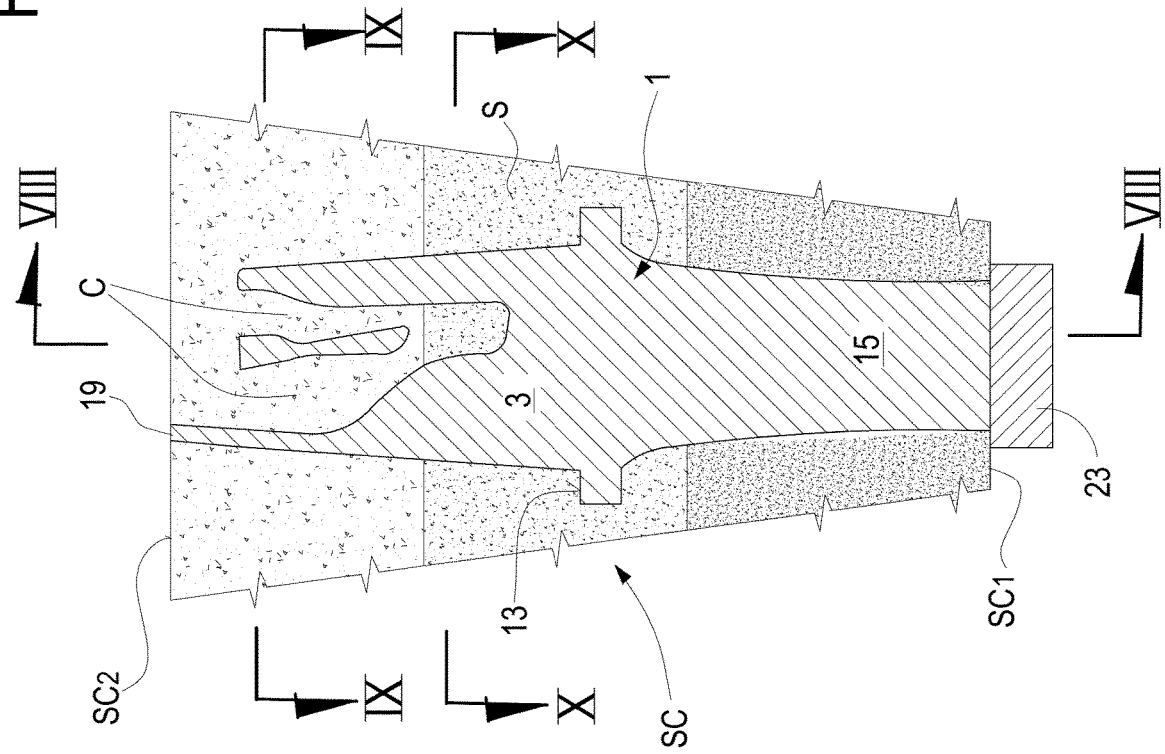

TURBINE BLADE MANUFACTURING METHOD

TECHNICAL FIELD

The present disclosure relates to manufacturing processes and, more specifically, to manufacturing of turbomachine components. Embodiments disclosed herein specifically relate to manufacturing of turbomachine blades.

BACKGROUND OF THE INVENTION

Investment casting or the lost-wax processes are used for forming complex three dimensional (3-D) components of a suitable material, such as metal. An exemplary cast component is the typical turbine rotor blade of gas turbine engine.

A turbine blade includes an airfoil integrally joined at its root with a blade platform, below which a supporting dovetail is integrally joined. The airfoil is hollow and includes one or more radial channels extending along the span thereof, which commence inside the blade dovetail, which has one or more inlets for receiving pressurized cooling air during operation in the gas turbine engine.

The airfoil may have various forms of intricate cooling circuits therein for tailoring cooling of the different portions of the opposite pressure and suction sides of the airfoil between the leading and trailing edges thereof and from the root at the platform to the radially outer tip.

Complex cooling circuits can include a dedicated channel inside the airfoil along the leading edge for providing internal impingement cooling thereof. A dedicated channel along the thin trailing edge of the airfoil can further be provided, for cooling the trailing edge. A multi-pass serpentine channel may be disposed in the middle of the airfoil, between the leading edge and trailing edge. The three cooling circuits of the airfoil have corresponding inlets extending through the blade dovetail for separately receiving pressurized cooling air.

The cooling channels inside the airfoil may include local features such as short turbulator ribs for increasing the heat transfer between the heated sidewalls of the airfoil and the internal cooling air. The partitions or bridges which separate the radial channels of the airfoil may include small bypass holes therethrough, such as the typical impingement cooling holes extending through the forward bridge of the airfoil for impingement cooling the inside of the leading edge during operation.

Such turbine blades are typically manufactured from high strength, superalloy metal materials in conventional casting processes. In the common investment casting or lost-wax casting process, a precision ceramic core is first manufactured to conform with the intricate cooling passages desired inside the turbine blade. A precision die or mold is also created, which defines the precise 3-D external surface of the turbine blade including its airfoil, platform, and integral dovetail.

The ceramic core is assembled inside two die halves, which form a space or void therebetween that defines the resulting metal portions of the blade. Wax is injected into the assembled dies to fill the void and surround the ceramic core encapsulated therein. The two die halves are split apart and removed from the molded wax. The molded wax has the precise configuration of the desired blade and is then coated with a ceramic material to form a surrounding ceramic shell.

The wax is melted and removed from the shell leaving a corresponding void or space between the ceramic shell and the internal ceramic core. Molten metal is then poured into the shell to fill the void therein and again encapsulate the ceramic core contained in the shell.

The molten metal is cooled and solidifies, and then the external shell and internal core are suitably removed leaving behind the desired metallic turbine blade in which the internal cooling passages are found.

The cast turbine blade may then undergo subsequent manufacturing processes, such as the drilling of suitable rows of film cooling holes through the sidewalls of the airfoil as desired for providing outlets for the internally channeled cooling air, which then forms a protective cooling air film or blanket over the external surface of the airfoil during operation in the gas turbine engine.

Gas turbine engine efficiency is increased typically by increasing the temperature of the hot combustion gases generated during operation, from which energy is extracted by the turbine blades. The turbine blades are formed of superalloy metals, such as nickel based superalloys, for their enhanced strength at high temperature to increase the durability and useful life of the turbine blades.

The intricate cooling circuits provided inside the airfoils are instrumental in protecting the blades from the hot combustion gases for the desired long life of the blades in an operating turbine engine.

Other casting methods for the manufacturing of gas turbine engine blades are disclosed in U.S. Pat. No. 7,413,001. According to these methods, a three-dimensional (3-D) model of the turbine blade is first generated with a CAD system or the like. The 3-D model is used to produce a 3-D synthetic model of the blade by means of a stereolithography apparatus. The 3-D synthetic model has inner cavities forming cooling medium channels therein. A core is then produced by injecting fluid core material, such as a ceramic slurry, in the cavities of the 3-D synthetic model. The core material is caused to set and the outer surface of the 3-D synthetic model is coated with a ceramic molding shell. This latter is formed by repeatedly dipping the 3-D synthetic model, with the core formed therein, in a suitable ceramic slurry. The outer ceramic coating is caused to set, thus forming the outer ceramic molding shell. Subsequently, the 3-D synthetic model is removed from around the ceramic core and from inside the surrounding ceramic shell by melting. Molten metal, e.g. a superalloy, is cast in the ceramic shell to fill the empty cavities formed therein once the 3-D synthetic model has been removed. Upon hardening of the metal, the ceramic shell and the ceramic core are removed. The metal blade is subsequently subjected to suitable finishing processes, as needed.

This improved cast method has several advantages over prior art methods, but still requires a long-lasting and complex sequence of operations.

Accordingly, it is desired to provide an improved casting method for 3-D components having intricate internal voids, such as turbomachine blades.

SUMMARY OF THE INVENTION

Disclosed herein is a method for manufacturing a turbine blade comprising a step of producing a shell and core assembly by additive manufacturing process, the shell and core assembly defining at least one internal cavity and having an internal structure corresponding to at least one internal cooling circuit of the turbine blade. Molten metal, e.g. a superalloy, such as a nickel-based superalloy, is poured in the internal cavity of the shell and core assembly. Once the metal is solidified, the shell and core are removed. The cast turbine blade thus obtained can be subjected to additional processing steps, such as thermal treatments and/or finishing.

According to some embodiments, the shell and core assembly is produced by ceramic powder material. The ceramic powder grains can be coated with a polymer resin. The additive manufacturing process can provide a step, during which adjacent layers of hardened material are formed, each layer having the shape of a cross section of the shell and core assembly. Hardening can be obtained by curing the resin, which coats the ceramic particles. After curing, the cured resin can be removed and the ceramic material forming the shell and core assembly can be sintered.

The polymer resin can a photo-polymerizing resin, i.e. a resin which can be cured by light energy, e.g. generated by a laser source. In some embodiments an UV laser source can be used as a power source for promoting polymerization of the resin during the additive manufacturing process.

In particularly advantageous embodiments, metal grains are caused to grow according to a preferred direction during the metal solidification step. The preferred unidirectional grain growth can be according to a root-to-tip direction of the blade.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 3 illustrates a schematic cross sectional view of a ceramic shell and core assembly prior to casting;

FIGS. 4, 5 and 6 illustrate schematic cross sectional views according to lines IV-IV, V-V and VI-VI of FIG. 3;

FIGS. 7, 8, 9 and 10 illustrate schematic cross sectional views similar to FIGS. 3-6 after casting.

DETAILED DESCRIPTION

Figure 1:
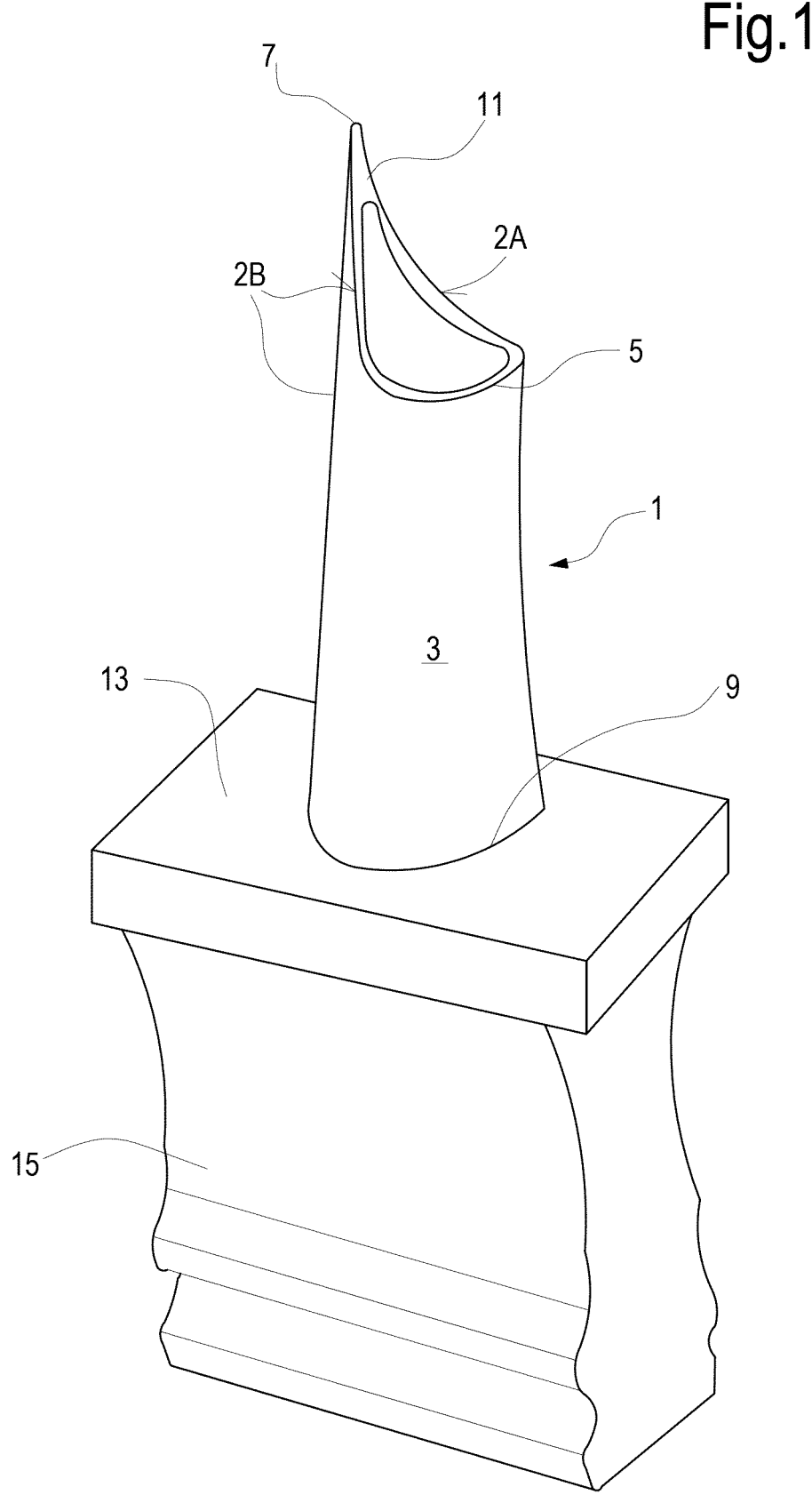
FIG. 1 illustrates a perspective view of a gas turbine blade.

Illustrated in FIG. 1 is a component 1 which can be manufactured by casting. The component may have any suitable configuration for casting. In the embodiment of FIG. 1, the component 1 is a gas turbine blade.

The gas turbine blade 1 includes an airfoil portion 3 having a generally concave pressure side 2A and an opposite generally convex suction side 2B extending between opposite leading and trailing edges 5, 7, and extending in radial span between a root 9 and an outer tip 11.

The airfoil is integrally joined to a platform 13 at the root 9 thereof, which defines the inner boundary for the hot combustion gases, which pass over the airfoil portion 3 during operation in the gas turbine. A mounting dovetail 15 is integrally formed below the platform 13, for mounting the blade 1 in a corresponding dovetail slot in the perimeter of a turbine rotor disk (not shown).

The turbine blade 1 has a complex 3-D shape. As described herein below the airfoil portion 3 is hollow and includes a suitable internal cooling circuit, which can be comprised of multiple radial main channels, extending from the root to the tip of the blade. The shape of the cooling circuit can vary depend upon the blade design. Exemplary embodiments of internal cooling circuits are described e.g. in U.S. Pat. No. 7,413,001, EP 1495820, U.S. Pat. Nos. 7,690,894, 8,066,483. The shape of the internal cooling circuit is not relevant to the present disclosure, as the method disclosed herein can be used for manufacturing blades having a variety of different cooling circuit arrangements therein. In general, the cooling circuit is configured and arranged for circulating a cooling medium, e.g. cooling air in the interior of the blade, in order to remove heat from the blade and prevent or reduce temperature-dependent damages to the blade.

As indicated above, conventional investment casting requires the fabrication of a ceramic core that corresponds with the various channels forming the internal cooling circuit of the blade. In known methods, the ceramic core is formed by casting a ceramic slurry in the empty volume of a blade model. A ceramic shell is formed around the blade model by dipping the blade model in a container of ceramic slurry. The ceramic slurry is allowed to set thus forming a ceramic mold with one or more inner cores and an outer shell. The blade model is removed, e.g. by melting. The empty cavities formed in the ceramic mold are filled with molten metal which is subsequently hardened and finally the ceramic shell and core(s) are removed.

Differently from the conventional methods, according to the present disclosure a ceramic shell and inner core assembly is formed by additive manufacturing, e.g. starting from a 3-D model of the turbine blade, generated by a CAD software for instance. The shell and core assembly forms a mold, wherein the molten metal, e.g. a high-temperature nickel-based superalloy, or any other castable material suitable for manufacturing the blade, is cast and hardened. The mold formed by the shell and core assembly is removed and the blade thus obtained can be subjected to conventional additional thermal treatments, machining, superfinishing or other manufacturing steps.

More specifically, the turbine blade 1 illustrated in FIG. 1 may be designed and defined in any conventional manner including CAD representations thereof, using suitable software programmed into a conventional digital computer. It is now common practice in the industry to create 3-D definitions or models of highly complex parts, such as the turbine blades, represented by the three dimensional coordinates of the entire configuration of the component, including external and internal surfaces thereof. Accordingly, the turbine blade 1 may be conventionally represented by its 3-D numerical model, which includes the precise definition of its entire external surface including the airfoil portion 3, platform 13 and dovetail 15, as well as its internal surface as represented by the channels forming the cooling circuit therein.

Figure 2:
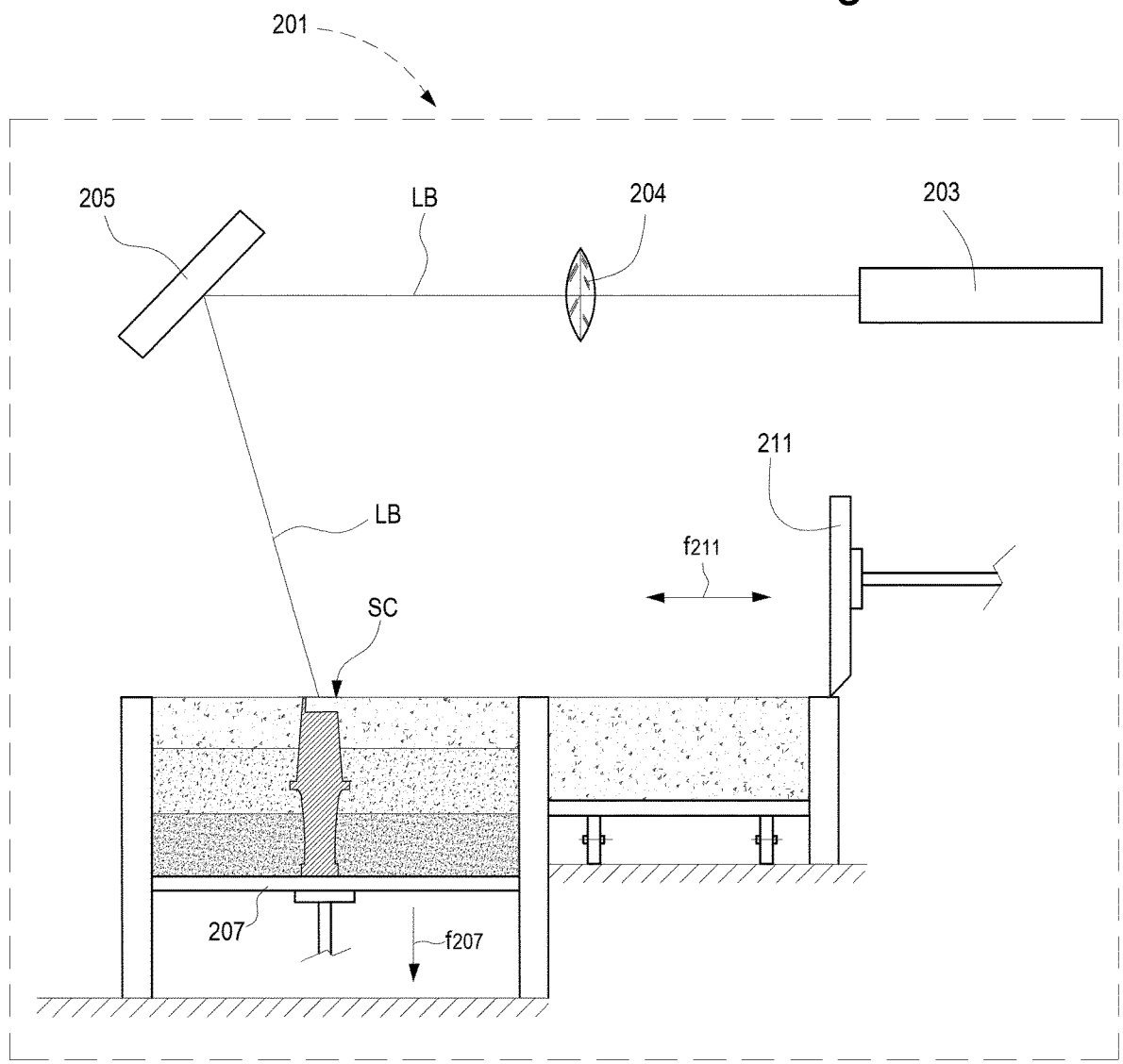
FIG. 2 schematically illustrates an additive manufacturing process for producing a ceramic shell and core assembly.

The 3-D model of the blade 1 can be used to electronically control an additive manufacturing apparatus. FIG. 2 is a schematic of an exemplary additive manufacturing apparatus, which can be used for manufacturing a shell and core assembly for the subsequent casting of the turbine blade 1.

As known to those skilled in the art, additive manufacturing is a process wherein an article having a complex shape is manufactured layer-by-layer starting from a powder material, which is locally melted and solidified or cured using an energy source.

Various additive manufacturing methods and apparatuses for producing the shell and core assembly SC can be used. FIG. 2 illustrates a schematic of a DMLM (Direct Metal Laser Melting) device 201. The device includes a laser source 203, e.g. a carbon dioxide laser. The laser beam LB generated by the laser source 203 is focused by optics 204 and can be deflected by mirrors 205. The mirrors 205 are controlled by a programmable control unit, not shown, to follow a pattern which corresponds to the cross-section of each layer of the shell and core assembly SC to be manufactured. A first vertically movable table 207 supports the workpiece during manufacturing. A second vertically movable table 209 forms the bottom of a powder material container. A horizontally movable wiper blade 211 distributes powder material from the powder material container on top of the workpiece B being manufactured.

The additive manufacturing process performed by device 201 is known per se and can be summarized as follows. The table 207 is moved in the upper position and a first layer of powder material is uniformly distributed on the table 207 by the wiper blade 211. The laser source 203 is activated and the laser beam LB is controlled so as to locally apply energy to powder material of the layer on table 207, such that the powder material is solidified in a portion of the layer corresponding to the cross section of the shell and core assembly SC. The table 207 is then lowered (arrow 207) by a stroke corresponding to the thickness of the subsequent layer. The table 209 is lifted (arrow f209) to make additional powder material available for the wiper blade 211. This latter performs a further reciprocating movement (arrow f211) to distribute the next powder material layer on top of the previous one on table 207 and the laser beam LB is activated and moved by mirrors 205 to selectively melt the powder material of the second layer.

The process is repeated until the final shell and core assembly SC is obtained.

In the schematic of FIG. 2 deflecting mirrors 205 are used. In other exemplary embodiments a fiber laser can be used, wherein the laser energy is conveyed by means of a fiber, the terminal end whereof is moved according to numerically controlled axes, e.g. X and Y axes, parallel to table 207.

The powder material can be a ceramic powder. For instance powder of alumina, zircon and compounds thereof such a zircon oxides, silica, or combinations thereof can be used. The ceramic powder can have an average grain size comprised between about 30 mesh and about 140 mesh.

In some embodiments the powder material can be resin-coated ceramic powder. The resin can be any polymeric resin suitable to be cured with the energy provided by the energy source of the additive manufacturing apparatus. If the energy source is a laser source, a photo-polymerizable resin can be used. In some embodiments the resin can be cured with an UV laser source. For instance, the coating resin can be a polymeric resin comprising epoxy, acrylic, aromatic and aliphatic ether groups.

Application of energy during additive manufacturing causes the resin, which forms the ceramic particles coating, to cure, thus obtaining a hard shell and core assembly SC. Once the additive manufacturing process has been completed, a de-binding and sintering step can be applied, to remove the cured resin and sinter the ceramic part, such that the final ceramic shell and core assembly SC is obtained.

Figure 6:
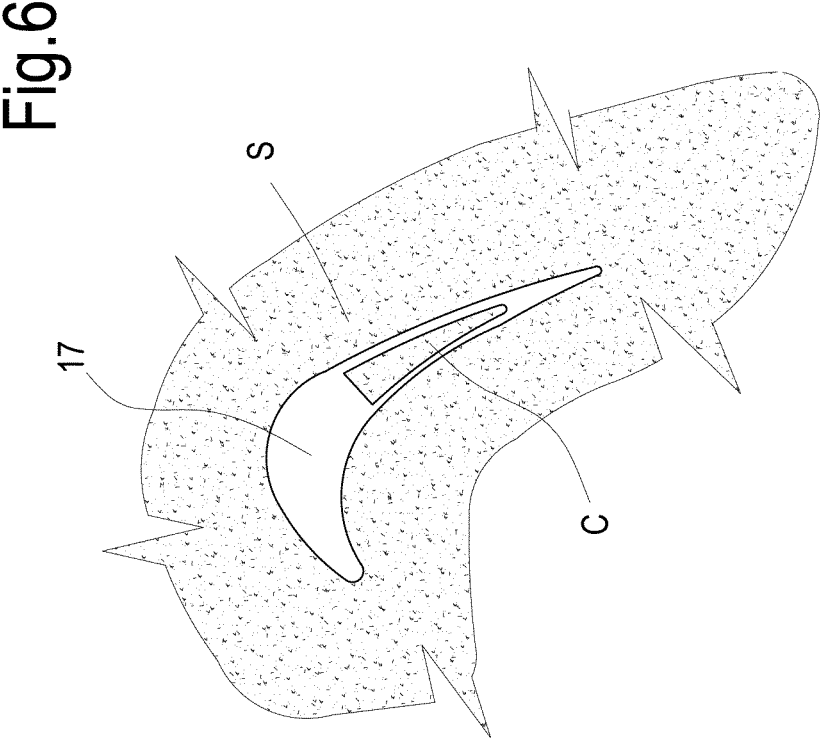
Figure 5:
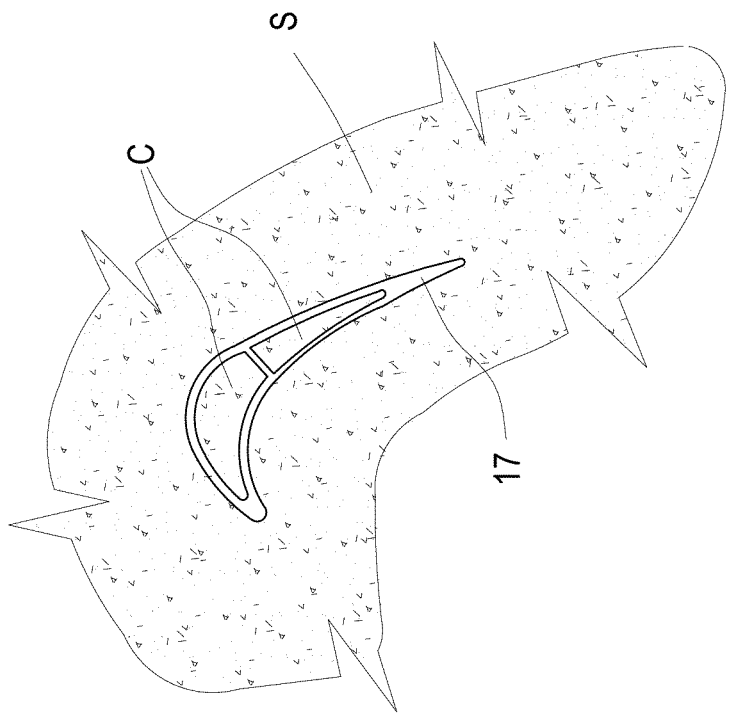
Figure 9:
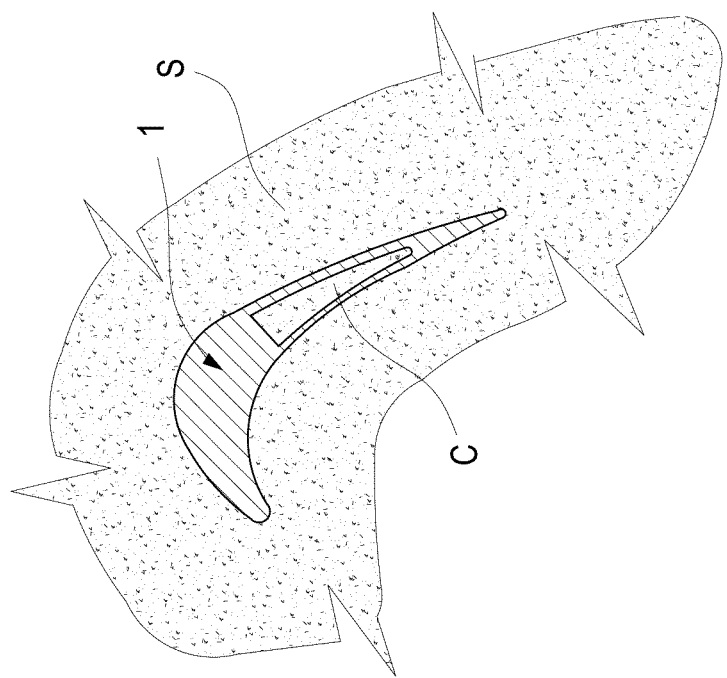
Figure 10:
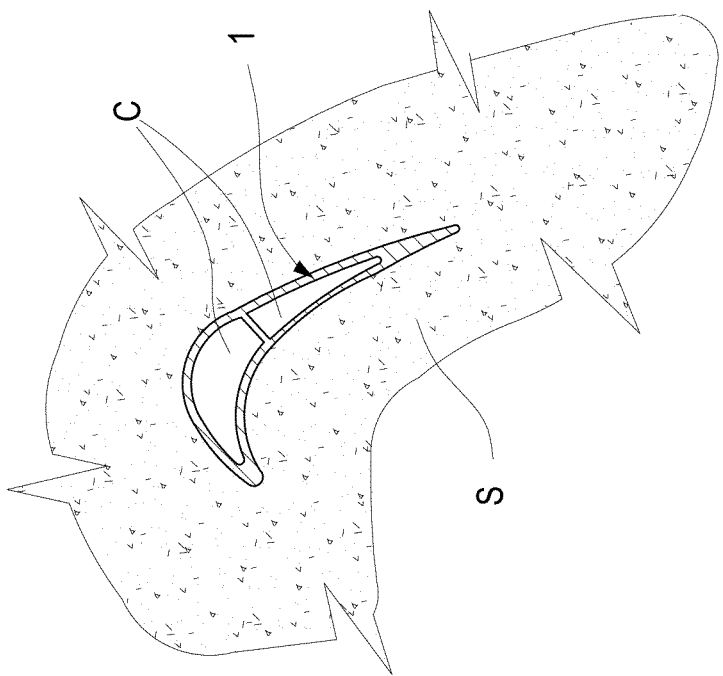

FIGS. 3-6 schematically illustrate a shell and core assembly SC which can be manufactured with an additive manufacturing process as described. More specifically, FIGS. 3 and 4 illustrate longitudinal sectional views, while FIGS. 5 and 6 illustrate cross sectional views, according to planes orthogonal to the direction of growth of the shell and core assembly SC.

The shell and core assembly SC has a first, or bottom end SC1 and a second, or top end SC2. The outer shell is labeled S and the inner core is labeled C. An empty cavity 17 is defined between the outer shell S and the inner core C. When molten metal is poured in the shell and core assembly SC, the empty cavity 17 will be filled with metal. The inner core C and the outer shell S will be removed once the molten metal is solidified, such that the inner cooling circuit of the blade 1 will be formed by the volume previously occupied by the core C.

In some embodiments, powder material having variable characteristics can be used for manufacturing the shell and core assembly SC. For instance, the features of the powder material can be changed from the first layer to the last layer such that a variable heat conductivity of the shell and core assembly SC is obtained starting from the bottom end SC1 to the top end SC2 of the shell and core assembly SC.

By way of example, FIG. 3 three different portions of the shell and core assembly SC are shown and schematically indicated at 20, 21 and 22. In the exemplary embodiment of FIG. 3 the heights H20, H21 and H22 of the three portions, i.e. their dimension in the direction of additive manufacturing of the shell and core assembly SC are equal to one another.

In other embodiments the heights H20, H21 and H22 of the portions 20, 21 and 22 can differ from one another. Additionally a smaller or a larger number of superposed portions can be provided. Each single portion 20, 21 and 22 is manufactured using the same powder material and can be formed by a plurality of superposed layers. During additive manufacturing, once a first portion, for instance portion 20, of the shell and core assembly SC has been completed, the powder used is changed and the next portion 21 is manufactured. Once the second portion 21 has been completed, the powder is changed again and the third portion 22 is manufactured.

In advantageous embodiments, at least one feature of the powder material used for manufacturing the subsequent portions 20, 21 and 22 is changed to obtain variable heat conductivity, moving from the first end SC1 to the second end SC2 of the shell and core assembly SC. For instance, the grain size of the powder material can vary from the first portion 20 to the last portion 22. The features of the powder material are changed to have a decreasing heat conductivity from the first, bottom end SC1 of the shell and core assembly SC to the second, top end SC2 of the shell and core assembly SC.

According to some embodiments, to modify the heat conductivity features of the shell and core assembly SC, the thickness TH of the portions 20, 21 and 22 can also vary from the first, bottom end SC1 to the second, top end SC2 of the shell and core assembly SC. More specifically, the thickness, i.e. the dimension of the shell in the direction orthogonal to the growing direction of the shell and core assembly SC increases.

In some embodiments, a heat removal plate 23 made of a material having high heat conductivity can be provided at the first, bottom end SC1 of the shell and core assembly SC. The heat removal plate 23 can be made of a material having a heat conductivity which is in an embodiment equal to or higher than about 200 $Wm^{-1}K^{-1}$, more particularly equal to or higher than about 300 $Wm^{-1}K^{-1}$. For instance, the heat removal plate 23 can be made of copper or silver.

In the next step, molten metal, e.g. a molten superalloy is casted in the shell and core assembly SC e.g. through suitable passages 19 which can be provided at the top end SC2 of the shall and core assembly SC. Heat dissipates through the shell S of the shell and core assembly SC and the metal gradually solidifies. The variable heat conductivity and the variable thickness of the shell S are such that a mainly unidirectional solidification of the molten metal is promoted. More specifically, grain growth in a single preferred direction parallel to the airfoil height (i.e. parallel to the root-tip direction) is achieved. The preferred crystallographic direction is chosen as the metal, e.g. a high temperature superalloy, has an anisotropic behavior and when the grains are grown in the root-to-tip direction of the blade, enhanced fatigue and creep strength is obtained.

FIGS. 7-10 illustrate the same sectional views of FIGS. 3-6 after casting of the with the blade 1 formed in the shell and core assembly SC.

Upon solidification of the metal cast in the shell and core assembly SC, the ceramic material forming the shell S and the core C is removed and the blade 1 can be subject to additional conventional heat treatments and/or machining, to obtain the final blade 1.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What we claim is:

1. A method for manufacturing a turbine blade, said method comprising:
    producing a shell and core assembly by an additive manufacturing process, the shell and core assembly defining at least one internal cavity and having an internal structure corresponding to at least one internal cooling circuit of the turbine blade, wherein the shell and core assembly has a heat conductivity which decreases from a first end of the shell and core assembly to a second end of the shell and core assembly;
    pouring molten metal in the internal cavity of the shell and core assembly;
    solidifying the metal;
    removing the shell and core assembly;
    wherein the molten metal is caused to solidify in a unidirectional grain growth, thus obtaining a directionally solidified turbine blade; and
    wherein the shell and core assembly includes at least three layers of powder material having different heat conductivity such that the heat conductivity of the shell and core assembly reduces from a bottom end of the shell and core assembly, corresponding to a platform of the turbine blade, to a top end of the shell and core assembly, corresponding to a tip of the turbine blade.

2. The method of claim 1, wherein the shell and core assembly is produced by a ceramic powder material.

3. The method of claim 1, wherein the shell and core assembly is produced by a resin-coated ceramic powder material, which is deposited layer-by-layer.

4. The method of claim 3, wherein the ceramic powder material is coated with a photo-polymerizable resin.

5. The method of claim 3, further comprising a step of removing the resin and sintering the ceramic powder material to obtain sintered ceramic shell and core assembly.

6. The method of claim 3, wherein the ceramic powder material is selected from the group consisting of: alumina, zircon, zircon-based compounds, zircon oxides, silica, or combinations thereof.

7. The method of claim 3, wherein the ceramic powder material has an average grain size comprised between about 30 mesh and about 140 mesh.

8. The method of claim 1, wherein the unidirectional grain growth is in a root-to-tip direction of the blade.

9. The method of claim 1, wherein the shell and core assembly is formed with an outer shell thickness increasing from the bottom end of the shell and core assembly to the top end of the shell and core assembly.

10. The method of claim 1, further comprises the step of arranging a heat removal plate at the bottom end of the shell and core assembly, and producing the shell and core assembly by additive manufacturing starting from the heat removal plate, the heat removal plate facing the inner cavity of the shell and core assembly.

11. The method of claim 10, wherein the heat removal plate has a heat conductivity equal to or higher than about 200 $Wm^{-1}K^{-1}$.

* * * * *